J. R. DUKE.
APPARATUS FOR DESTROYING INSECTS.
No. 193,643. Patented July 31, 1877.
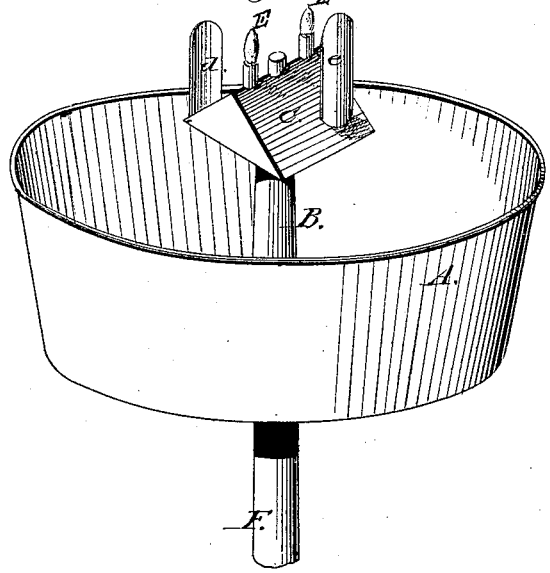
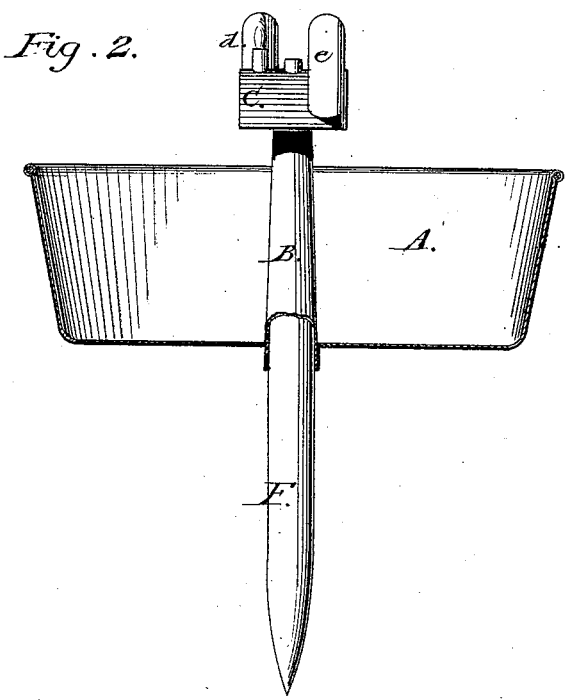

UNITED STATES PATENT OFFICE.

JESSE R. DUKE, OF NORRISTOWN, ARKANSAS, ASSIGNOR OF ONE-HALF HIS RIGHT TO WILLIAM J. PATTON.

IMPROVEMENT IN APPARATUS FOR DESTROYING INSECTS.

Specification forming part of Letters Patent No. 193,643, dated July 31, 1877; application filed November 29, 1876.

*To all whom it may concern:*

Be it known that I, JESSE R. DUKE, of the town of Norristown, county of Pope, and State of Arkansas, have invented certain new and useful Improvements in Apparatus for Destroying Moths or Millers, which produce the cut-worm, boll-worm, curculio, or other worms or insects which destroy or prey upon fruit, vegetables, &c., of which the following is a specification:

This invention relates to an improved apparatus of the class in which a light attracts moths or millers, said light being produced by the flame of a lamp, which scorches the insects when they fly into it, and causes them to fall into a pan or box containing water or other fluid, chemically prepared, or otherwise.

It consists of a pan of sheet metal, having a tube or socket rising from the center of the bottom thereof, and supporting a lamp having inclined sides and a very narrow or sharp top, said lamp projecting above the top of the pan.

In the accompanying drawing, Figure 1 is a perspective view of my invention; and Fig. 2 is a side elevation, partly in section.

A is a sheet-metal pan, and B is a tube or socket rising from the center of the bottom thereof. This tube or socket is soldered water-tight around a hole in the bottom of the pan. C is a lamp, having a cross-section of the shape of an isosceles triangle with a narrow base, which gives the sides of the lamp a steep slope. E are burners, and *d* and *e* reflectors. F is the stake upon which the apparatus is placed when in use, said stake fitting through the hole in the bottom of the pan, and into socket B. There is a socket in the center of the lamp also, and into this fits the socket B. The lamp may be removed for filling or cleansing.

To use my invention, the stake F should be driven into the ground, (say, in an orchard, vineyard, or other place where is is desired to prevent the existence of that class of worms which are injurious to trees, vines, or plants,) and the apparatus placed upon the top thereof, which fits into socket B, as before explained. At night the burners of the lamp should be lighted, and the light will attract the moths or millers, which, as is well known, will fly into the flame, which scorches them, and they will fall upon the sleeply-inclined sides of the lamp, and slide down into the water or other fluid in the pan. Were the sides of the lamp straight, so that the lamp should have a wide top, the falling insects would soon clog up the burners.

It is well known that moths or millers fly about at night, and that their eggs produce worms which are injurious to trees, &c., and I am aware that the method of destroying these moths by an apparatus in which a flame attracts and scorches them so that they fall is not new; nor is it new to provide such an apparatus with a pan for holding a fluid, and I do not claim, broadly, the invention of such an apparatus; but

I claim—

As an improved article of manufacture the apparatus for destroying millers, moths, &c., consisting of the pan A, provided with socket B, and triangular lamp C, having one or more burners located at or near its apex, which projects above the pan, substantially as described.

JESSE R. DUKE.

Witnesses:
JAMES E. BATTENFIELD,
MARCO B. ROYS.